United States Patent
Nam et al.

(10) Patent No.: US 8,067,873 B2
(45) Date of Patent: Nov. 29, 2011

(54) MOTOR AND THE COMPRESSOR INCLUDING THE SAME

(75) Inventors: Hyuk Nam, Changwon-si (KR); Sang-Joon Eum, Changwon-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/450,007

(22) PCT Filed: Mar. 7, 2008

(86) PCT No.: PCT/KR2008/001323
§ 371 (c)(1), (2), (4) Date: Mar. 22, 2010

(87) PCT Pub. No.: WO2008/111775
PCT Pub. Date: Sep. 18, 2008

(65) Prior Publication Data
US 2010/0187935 A1    Jul. 29, 2010

(30) Foreign Application Priority Data

Mar. 9, 2007    (KR) .......................... 10-2007-0023513

(51) Int. Cl.
*H02K 1/27*    (2006.01)
(52) U.S. Cl. ............................... 310/156.78; 310/156.83
(58) Field of Classification Search .................. 310/211, 310/156.78, 156.79, 156.81–156.84
See application file for complete search history.

(56) References Cited

U.S. PATENT DOCUMENTS

| | | | | |
|---|---|---|---|---|
| 4,469,970 A | * | 9/1984 | Neumann | 310/156.78 |
| 4,476,408 A | * | 10/1984 | Honsinger | 310/156.84 |
| 4,559,463 A | * | 12/1985 | Kobayashi | 310/156.53 |
| 6,727,627 B1 | * | 4/2004 | Sasaki et al. | 310/211 |
| 6,737,783 B2 | * | 5/2004 | Yanashima et al. | 310/211 |
| 2003/0090170 A1 | | 5/2003 | Yoshino et al. | |

FOREIGN PATENT DOCUMENTS

| | | |
|---|---|---|
| DE | 10254967 A | 6/2004 |
| GB | 917209 | 1/1963 |
| GB | 940997 | 11/1963 |
| KR | 10-2002-0061282 A | 7/2002 |
| KR | 10-2004-0051549 A | 6/2004 |

\* cited by examiner

*Primary Examiner* — Dang D Le
(74) *Attorney, Agent, or Firm* — McKenna Long & Aldridge LLP

(57) ABSTRACT

A motor, namely, a motor with minimum loss and improved efficiency is disclosed. More specifically, a motor having enhanced starting torque performance and increased normal operation efficiency is disclosed. In the motor in which a rotor is started using induction torque generated as power is supplied to a coil of a stator, the rotor includes a rotor core, conductive bars arranged, along a circumferential direction, in an outer rim region of the rotor core, to generate an induction current, flux barriers formed in the rotor core, to interrupt flow of a magnetic flux, for generation of reluctance torque, and magnets provided in the rotor core, to generate a magnetic flux, for generation of magnetic torque.

23 Claims, 6 Drawing Sheets

[Fig. 1]
--Prior Art--
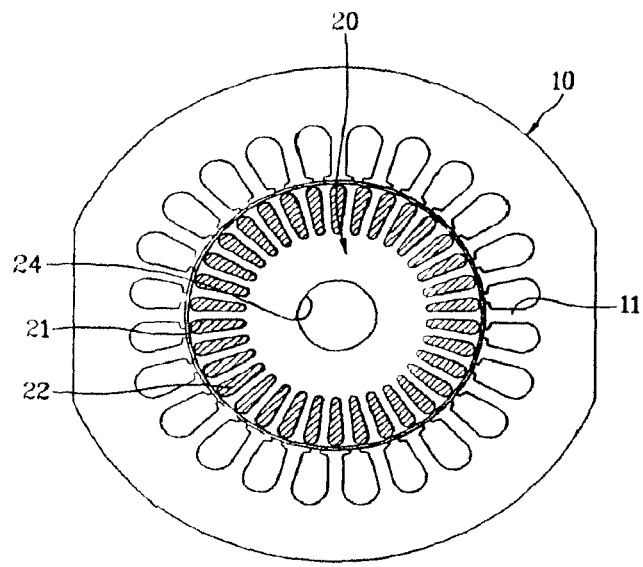
[Fig. 2]
--Prior Art--
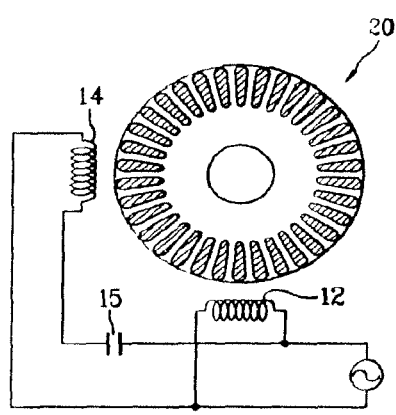
[Fig. 3]
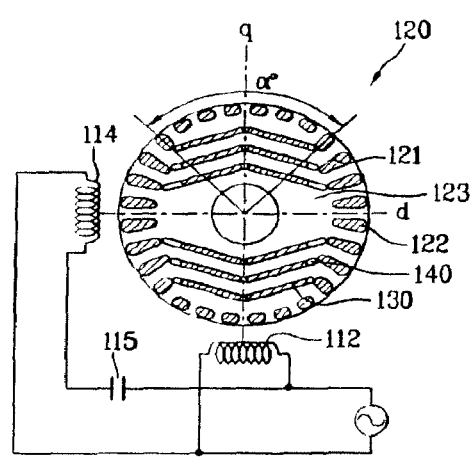

[Fig. 4]
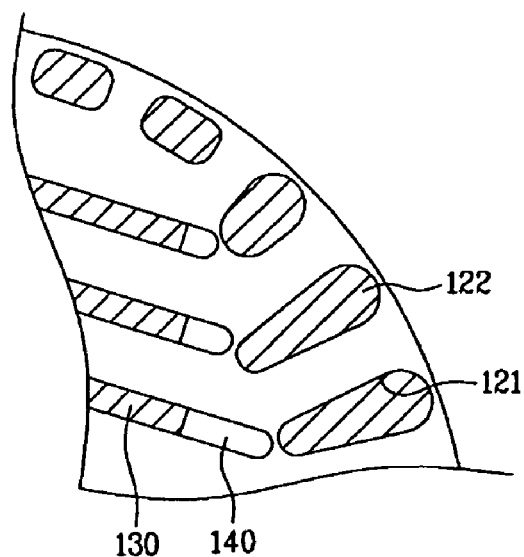
[Fig. 5]
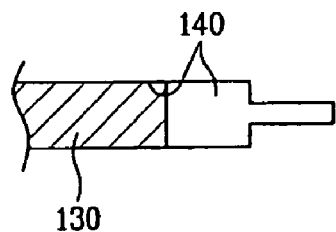
[Fig. 6]
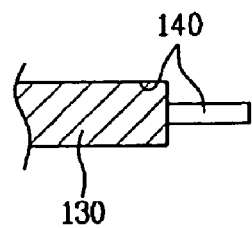
[Fig. 7]
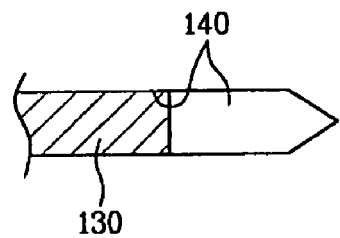

[Fig. 8]
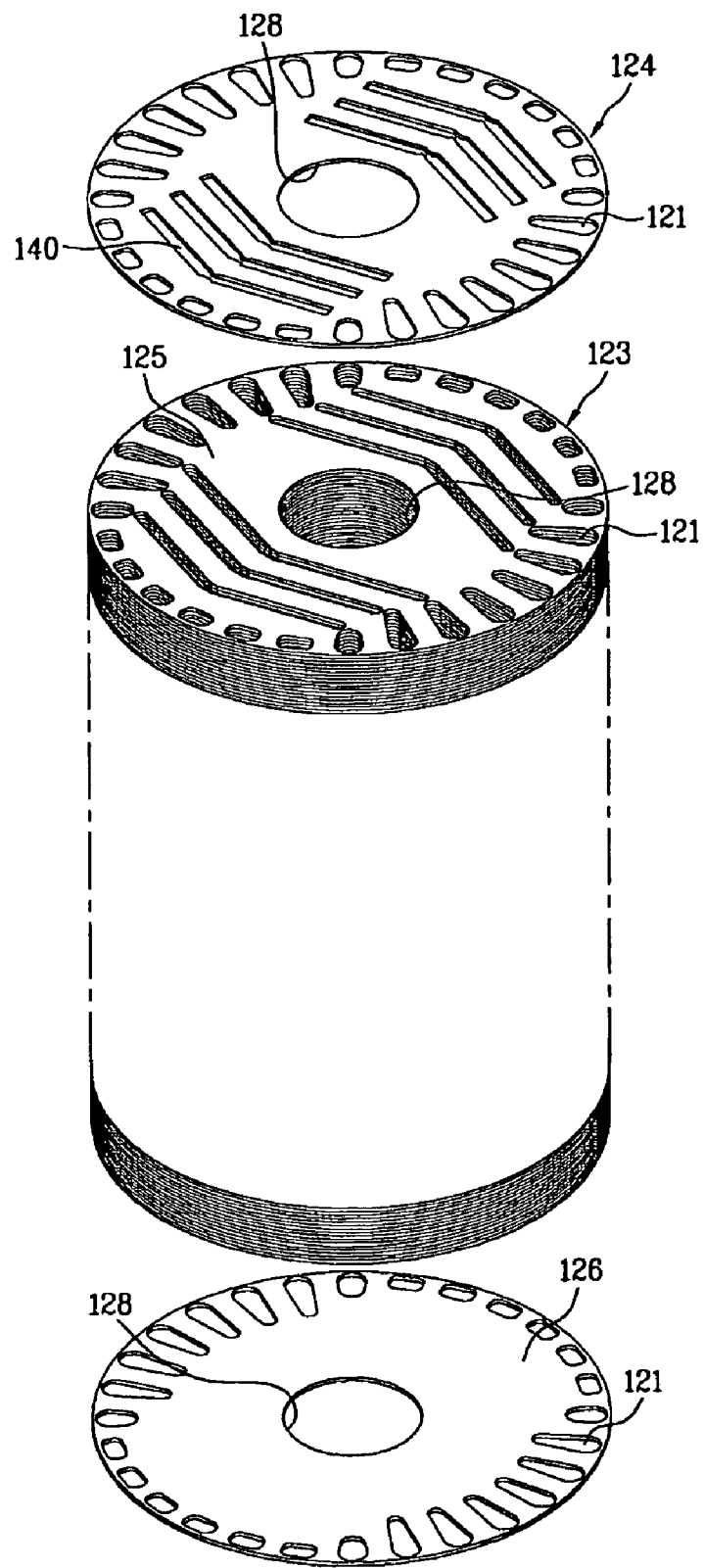

[Fig. 9]
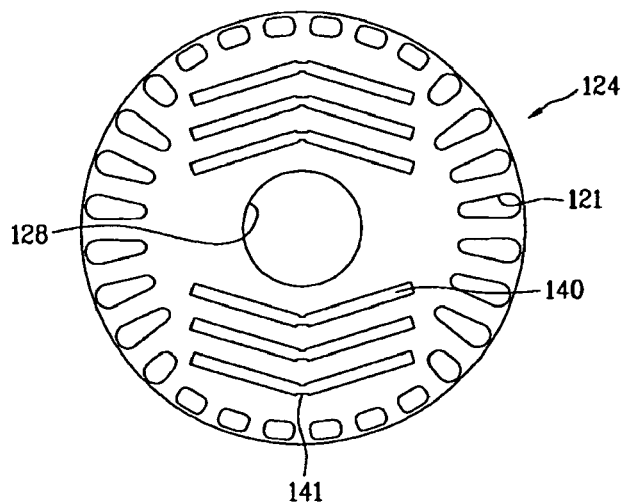
[Fig. 10]
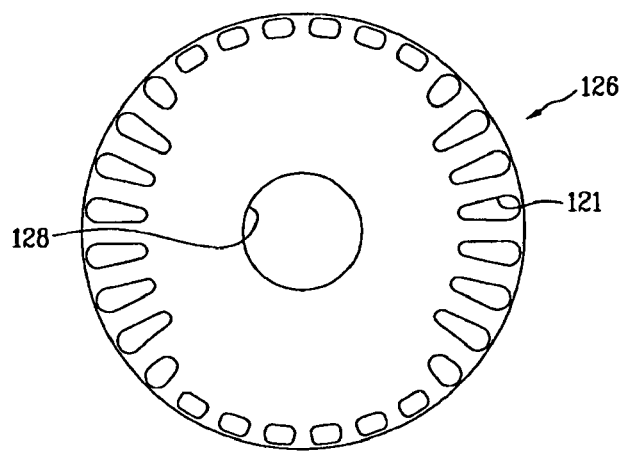
[Fig. 11]
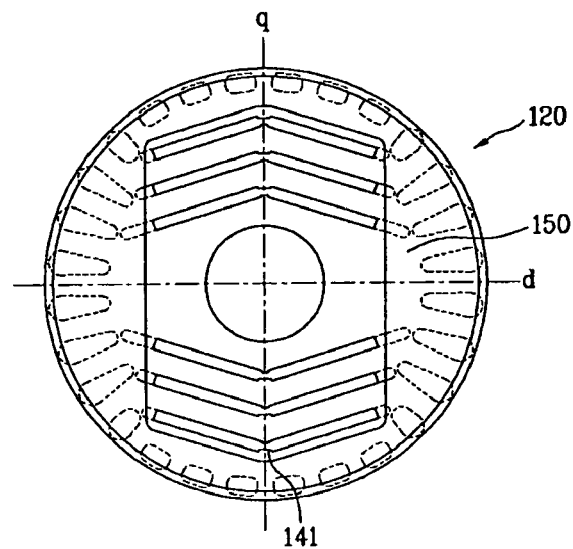

[Fig. 12]
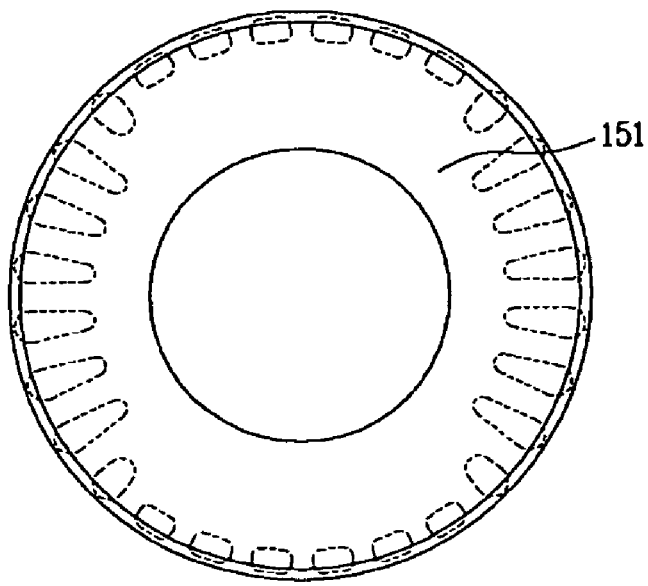
[Fig. 13]
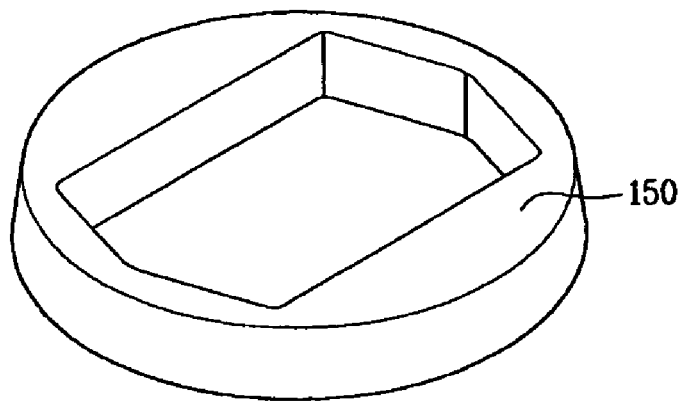
[Fig. 14]
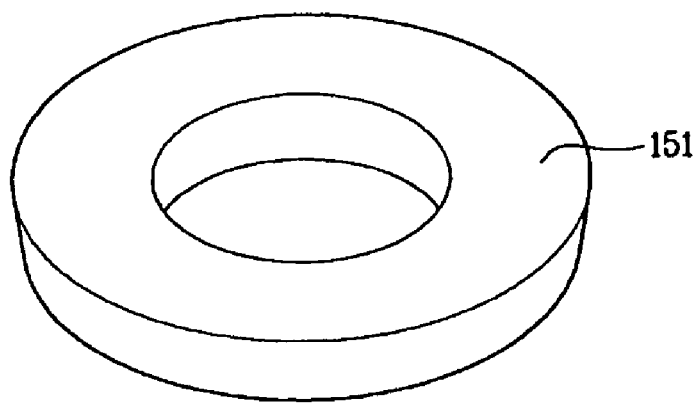

[Fig. 15]
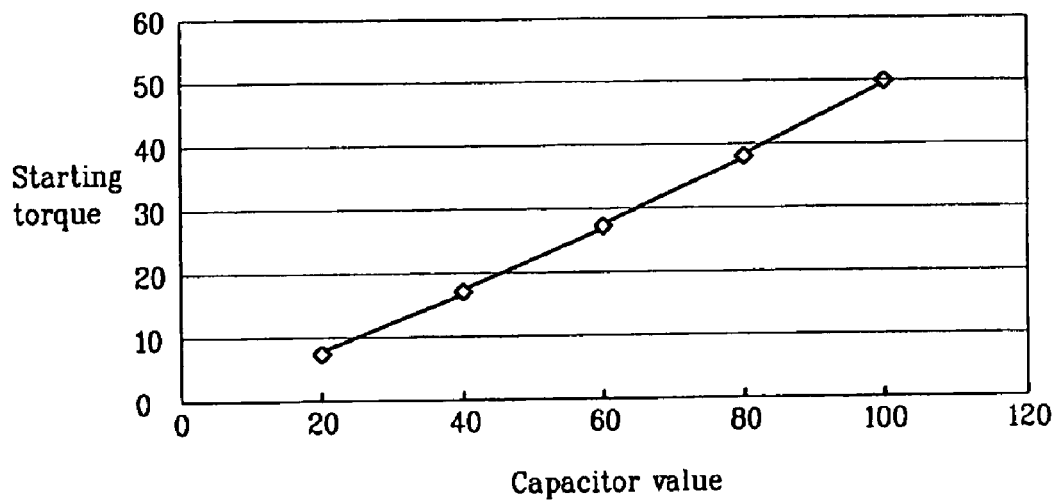
[Fig. 16]
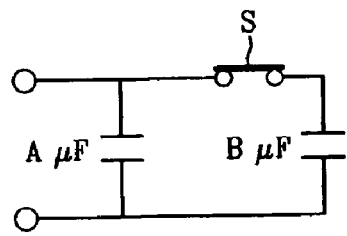
[Fig. 17]
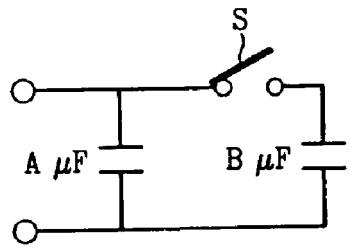

MOTOR AND THE COMPRESSOR INCLUDING THE SAME

This application is a National Stage Entry of International Application No. PCT/KR2008/001323, filed Mar. 7, 2008, and claims priority to Korean Patent Application No. 10-2007-0023513, filed in Korea on Mar. 9, 2007, each of which is hereby incorporated by reference in its entirety as if fully set forth herein.

TECHNICAL FIELD

The present invention relates to a motor, and more particularly, to a motor with minimum loss and improved efficiency while achieving enhanced starting torque performance and increased normal operation efficiency.

In addition, the present invention relates to a motor which is effectively applicable to variable load, and a variable capacity compressor using the motor.

BACKGROUND ART

In general, a single-phase induction motor includes a stator, on which a main coil and an auxiliary coil are wound with a spatial interval of 90 degrees therebetween. A source voltage is applied directly to the main coil, and also, is applied to the auxiliary coil via a capacitor and a switch. This is because the main coil cannot generate a starting force alone even if a voltage is applied thereto. Therefore, with the assistance of a start device such as the auxiliary coil, etc., the stator generates a rotating magnetic field to start the rotor.

The start device is classified, according to the kind thereof, into a split-phase type, shading-coil type, capacitor-start type, repulsive-start type, and the like.

As an example of a single-phase induction motor having the above-described start device, a capacitor-start type single-phase induction motor is illustrated in FIGS. 1 and 2.

FIG. 1 illustrates a stator and a rotor of a general single-phase induction motor, and FIG. 2 illustrates a simplified circuit of the rotor and stator coils.

When only a main coil 12 is wound on a stator 10, the stator 10 generates only an alternating magnetic field, and thus, starting of a rotor 20 is not accomplished. For this reason, an auxiliary coil 14 must be wound on the stator 10 to generate a rotating magnetic field. With the rotating magnetic field, the rotor can be started and rotated in a predetermined direction. Namely, starting torque arises via the rotating magnetic field.

In the simplified circuit of FIG. 2, a capacitor 15 serves to delay a phase of current to be applied to the auxiliary coil 14, so as to generate starting torque via interaction between the auxiliary coil 14 and the main coil 12. Once being started, rotation of the rotor 20 is maintained, under an assumption of no load variation, even if power is not applied to the auxiliary coil 14. Namely, it is unnecessary to apply power to the auxiliary coil 14 if the rotor 20 maintains a predetermined or more revolutions per minute after being started. However, when load varies, additional starting torque is required. Therefore, it is preferable that power always be supplied to the auxiliary coil 14 via the capacitor 15.

Of course, a three-phase induction motor can generate a rotating magnetic field even when only a main coil is wound on a stator, and does not require winding of the above-described auxiliary coil on the stator. That is, the three-phase induction motor does not require a separate start device.

An advantage of the above-described single-phase induction motor is that it does not require an inverter like a brushless DC (BLDG) motor or reluctance motor and can be started directly using single-phase commercial power, resulting in superior price competitiveness.

Now, the above-described general single-phase induction motor will be described in detail with reference to FIGS. 1 and 2.

The stator 10, which has a hollow internal configuration, includes a plurality of teeth 11 arranged, along an inner circumference thereof by a desired angular interval, to protrude radially inward, and a main coil 12 wound on the respective teeth 11 to have a polarity of N-pole or S-pole upon primary application of a current.

Here, an insulator (not shown) is interposed between the teeth 11 and the main coil 12. The insulator serves not only to provide electrical insulation between the teeth 11 and the main coil 12, but also to facilitate easy winding of the main coil 12.

The stator 10 further includes an auxiliary coil 14, which is wound on the stator 10 to have a desired spatial angular interval with the main coil 12 and is adapted to generate a rotating magnetic field upon application of a current. Of course, the auxiliary coil 14 is also wound on the teeth 11 by interposing an insulator therebetween. The main coil 12 and auxiliary coil 14 can be called together "stator coils" or simply "coils".

The coils 12 and 14 are connected to a single-phase power source, and at the same time, are connected in parallel to each other. The capacitor 15 is connected to the auxiliary coil 14 in series. Again, although not shown, the capacitor 15 may be optionally connected to the power source via a switch.

Generally, the rotor 20 may be a frequently used squirrel cage rotor. FIGS. 1 and 2 illustrate the squirrel cage rotor.

The rotor 20 is normally fabricated by stacking steel plates one above another to constitute a rotor core, and each steel plate is formed, along an outer circumference thereof, with a plurality of slots 21 at desired radial positions from the center of the steel plate by a desired angular interval. The rotor 20 further includes rod-shaped conductive bars 22 inserted into the respective slots 21 of the rotor core. The rod-shaped conductive bars 22 are normally made of copper or aluminum rods.

Both ends of the squirrel cage rotor core are connected with not-shown end-rings (See FIGS. 13 and 14), to achieve electric connection via the conductive bars 22, and the end-rings are generally formed via aluminum die-casting. Specifically, the conductive bars 22 and end-rings are integrally formed with each other via aluminum die-casting, and both the end-rings are located, respectively, at the top and bottom of the rotor core.

Meanwhile, the rotor 20 is centrally provided with a shaft hole 24. A rotating shaft (not shown) to transmit a rotating force of the rotor 20 to an external component will be press-fitted into the shaft hole 24, such that the rotor 20 and rotating shaft constitute a unitary rotating body.

In operation of the above-described single-phase induction motor, if power is applied to the coils, an induction current is generated in the conductive bars 22, causing the rotor 20 to be rotated by resulting induction torque. However, in this case, the conductive bars 22 cause loss, namely, conductive bar loss. Due to the conductive bar loss, therefore, improvement in efficiency of a motor of a predetermined size is limited. The single-phase induction motor is problematic when high-efficiency is required.

Other problems of the conductive bar loss include an increase in the temperature of the rotor 20 and a great variation of loss depending on the temperature variation. In particular, the higher the temperature, the greater the conductive bar loss. For this reason, improvement in motor efficiency at high temperature is limited.

Meanwhile, the single-phase induction motor, in consideration of characteristics thereof, must always be operated at a lower speed than synchronous speed, in order to generate induction torque. This is because the single-phase induction motor theoretically has zero torque at the synchronous speed, and the smaller the rotating speed, the greater the torque.

Accordingly, in the single-phase induction motor, as motor load, namely, load applied to the rotating shaft varies, a rotating speed of the rotating shaft, namely, a rotating speed of the motor varies, and this makes it difficult to control the motor depending in consideration of load variation.

DISCLOSURE OF INVENTION

Technical Problem

An object of the present invention devised to solve the problems lies on a motor, which can solve the above-described problems of a single-phase induction motor.

Another object of the present invention devised to solve the problem lies on a motor having improved efficiency, and more particularly, on a motor which can operate at synchronous speed during normal operation, and consequently, can achieve maximum normal operation efficiency.

A further object of the present invention devised to solve the problem lies on a motor, which can always operate at synchronous speed even if motor load varies during normal operation, resulting in easy motor control.

A still further object of the present invention devised to solve the problem lies on a motor, which can achieve maximum efficiency, in particular, at high temperature.

A still further object of the present invention devised to solve the problem lies on a motor, which has starting characteristics of a general single-phase induction motor without using an inverter, thereby achieving reduced manufacturing costs.

A still further object of the present invention devised to solve the problem lies on a compressor, which can achieve improved efficiency and facilitate variable capacity operation thereof via the use of the above-described motor.

Technical Solution

The objects of the present invention can be achieved by providing a motor, in which a rotor is started using an induction torque generated as power is supplied to a coil of a stator, wherein the rotor comprises: a rotor core; conductive bars arranged, along a circumferential direction, in an outer rim region of the rotor core, to generate an induction current; flux barriers formed in the rotor core, to interrupt flow of a magnetic flux, for generation of a reluctance torque; and magnets provided in the rotor core, to generate a magnetic flux, for generation of a magnetic torque.

Here, the rotor may be started using an induction torque generated by the conductive bars, and, once started, may be rotated using the reluctance torque generated by the flux barriers and the magnetic torque generated by the magnets. In addition, the rotor, once started, may be rotated at synchronous speed using the reluctance torque and the magnetic torque.

Specifically, the motor according to the present invention has starting characteristics of a general induction motor upon starting of the rotor, and once started, has rotating characteristics of a synchronous motor. The motor according to the present invention, once started, is rotated at synchronous speed using the reluctance torque and the magnetic torque during normal operation, and can achieve high efficiency. Accordingly, it is possible to provide a high-efficiency motor without complex motor starting components.

The induction torque may be generated by a rotating magnetic field generated in the stator and the induction current generated in the rotor. Accordingly, it is unnecessary to supply three-phase power to the coil. Namely, single-phase power can be supplied, similar to a general single-phase induction motor.

When the single-phase power is supplied to the coil, the coil preferably includes a main winding and an auxiliary winding, for starting of the rotor. Of course, although such a starting configuration can be changed variously, the following description is limited to a capacitor-start type induction motor for the convenience of description.

When the capacitor-start type induction motor is applied to the present invention, the main winding and the auxiliary winding are connected to a single-phase power source while being connected in parallel to each other. In addition, a capacitor is connected to the auxiliary winding in series.

Preferably, the flux barriers are arranged to provide the rotor with at least two or more even numbers of poles. With the flux barriers, the rotor may be provided with a q-axis extending radially from a center of the rotor, along which the flow of a magnetic flux is interrupted by the flux bathers, and a d-axis extending radially from the center of the rotor, along which the flow of a magnetic flux is not interrupted.

For example, when the rotor includes two poles, the q-axis and the d-axis may be spatially orthogonal to each other. Preferably, the flux barriers are symmetrical about the q-axis.

Preferably, each flux barrier is tilted, about the center of the rotor, from the center to both ends thereof such that both the ends of the flux barrier are far away from or closer to an axis orthogonal to the q-axis. This has the effect of further increasing an occupation rate of the flux barriers in a direction of the q-axis of the rotor core, thereby further increasing reluctance in the q-axis direction. Preferably, the flux barriers, constituting each pole, are arranged in at least two or more layers.

The flux barrier of each layer may be continuously formed, and the flux barriers, from the outside nearer to the inside of the rotor, may have a longer length.

The magnets may be inserted into a partial region of the respective flux barriers. The magnets may include at least two or more magnets arranged in a longitudinal direction of the respective flux barriers. Of course, the magnets may include at least two or more magnets arranged in a longitudinal direction of the rotor. In this case, preferably, the magnets include unit magnets having the same shape as one another.

Preferably, each flux barrier is formed with a stepped portion to determine insertion positions of the associated magnets.

Preferably, an imaginary line, which connects corresponding tip ends of the magnets inserted in the respective layers of flux barriers, is parallel to the q-axis. With this arrangement of the tip ends of the magnets, the greatest magnetic flux can be generated on the basis of the q-axis. In addition, the total magnetic flux, generated by all the magnets, can take the form of a square wave rather than a sine wave.

The arrangement of the magnets enables generation of greater magnetic torque on the basis of the q-axis and, as will be described hereinafter, permits an increase in a radial width of end-rings. The increased radial width of the end-rings has the effect of reducing loss due to the presence of end-rings.

Of the conductive bars, preferably, a radial width of the conductive bars, which are arranged within an angle defined between the center of the rotor and both ends of an outermost flux barrier, is smaller than that of other conductive bars. This is because as the radial width of the conductive bars is increased, a flow path of the magnetic flux near the conductive bars becomes extremely narrow. This reduces a reluctance torque due to premature saturation of the magnetic flux.

Preferably, both ends of the respective flux barriers are arranged closely opposite the adjacent conductive bars, to minimize leakage of magnetic flux through gaps between the flux barriers and the conductive bars. Preferably, the ends of each flux barrier have a smaller width than that of the remaining portion of the flux barrier. This is because, when forming the conductive bars and end-rings via aluminum die-casting, molten aluminum may be introduced into the flux barriers upon receiving a pressure.

In another aspect of the present invention, provided herein are a compressor including the above-described motor and a method for controlling the same.

Here, the motor included in the compressor has features in that a rotor is started by induction torque generated as single-phase power is supplied to a coil of a stator, and once rotated, is rotated at synchronous speed, and that the coil includes a main winding connected with a single-phase power source for supply of the single-phase power and an auxiliary winding connected parallel to the main winding while being connected with the single-phase power source, and capacitors, connected parallel to each other, are connected to the auxiliary winding in series.

Preferably, any one of the capacitors is selectively electrically connected with the auxiliary winding via a switch. The switch is preferably selectively turned on according to load variation of the motor. For example, the switch may be turned on under high motor load, and may be turned off under low motor load. In addition, the switch can be kept on during initial starting of the motor.

The compressor may be a variable capacity compressor in which a single motor is operated to compress a refrigerant. Here, initial starting of the compressor means initial starting of the motor.

The variable capacity compressor includes a cylinder in which the refrigerant is compressed. As the quantity of the refrigerant to be compressed in the cylinder varies according to motor load, a capacity of the compressor can vary. The capacity of the compressor may also vary as only a part of a plurality of cylinders are optionally operated or all the cylinders are operated.

The compressor can always begin to operate under a low load condition, regardless of an initial operating condition.

Advantageous Effects

According to the present invention, a motor having improved efficiency and a variable capacity compressor using the same can be accomplished.

More specifically, according to the present invention, it is possible to provide a motor, which operates at synchronous speed, in particular, during normal operation, thereby achieving maximum normal operation efficiency.

Further, according to the present invention, even if motor load varies during normal operation, the motor can always operate at synchronous speed. As a result, it is possible to provide a motor, which is easy to control and has maximum efficiency, in particular, at high temperature.

According to the present invention, the motor can achieve starting characteristics of a general single-phase induction motor without using an inverter, resulting in a reduction in manufacturing costs thereof.

Furthermore, according to the present invention, starting characteristics of the for can be enhanced regardless of initial load, to rapidly reach normal operation. As a result, a motor, which can vary a capacity and thus, achieve high efficiency during normal operation, and a variable capacity compressor using the motor can be accomplished.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 1 is a sectional view illustrating a rotor and a stator of a conventional induction motor.

FIG. 2 is a conceptual view schematically illustrating a rotor and stator coils of the conventional induction motor.

FIG. 3 is a conceptual view schematically illustrating a rotor and stator coil circuit of a motor according to the present invention.

FIG. 4 is an enlarged sectional view illustrating a part of the rotor shown in FIG. 3.

FIGS. 5 to 7 are sectional views illustrating different embodiments related to the shape of a tip-end of a flux barrier shown in FIG. 3.

FIG. 8 is an exploded perspective view illustrating a rotor core of a motor according to the present invention.

FIG. 9 is a plan view illustrating configuration of an uppermost unit rotor core of a motor according to an embodiment of the present invention;

FIG. 10 is a plan view illustrating a lowermost unit rotor core of a motor according to an embodiment of the present invention, or a plan view illustrating an uppermost unit rotor core of a motor according to another embodiment of the present invention.

FIG. 11 is a top plan view illustrating a rotor of a motor according to an embodiment of the present invention.

FIG. 12 is a top plan view illustrating a rotor of a motor according to an embodiment of the present invention, or a bottom plan view illustrating a rotor of a motor according to another embodiment of the present invention.

FIG. 13 is a perspective view illustrating an upper end-ring of a motor according to an embodiment of the present invention.

FIG. 14 is a perspective view illustrating a lower end-ring of a motor according to an embodiment of the present invention, or a perspective view illustrating an upper end-ring of a motor according to another embodiment of the present invention.

FIG. 15 is a graph illustrating the relationship between motor's starting torque and capacitor value.

FIG. 16 is a circuit diagram schematically illustrating a part of a stator coil circuit, under high motor load, according to the present invention.

FIG. 17 is a circuit diagram schematically illustrating a part of a stator coil circuit, under low motor load, according to the present invention.

BEST MODE FOR CARRYING OUT THE INVENTION

Reference will now be made in detail to a motor according to the present invention, examples of which are illustrated in the accompanying drawings of FIGS. 3 to 15. In addition, for the convenience of description, an inner type motor, in which a rotor is rotatable inside a stator, will be described hereinafter. However, the motor according to the present invention is not essentially limited to the inner type motor.

The motor according to the present invention is a motor, in which a rotor is started using an induction torque, and therefore, can take the same configuration as that of a conventional general induction motor. Specifically, referring to FIG. 3 illustrating the configuration of an induction motor according to the present invention, the induction motor can include a rotor 120 provided with slots 121 and conductive bars 122, and stator coils 112 and 114 (hereinafter, referred to as "coils") and a capacitor 115 for rotation of the motor, etc. Hereinafter, a detailed description of overlapped configurations will be omitted.

Note that the motor according to the present invention can further include flux barriers 140, which are formed in a rotor core to interrupt the flow of a magnetic flux, for generation of reluctance torque. In addition, the motor according to the present invention can further include magnets 130, which are embedded in the rotor core to generate a magnetic flux, for generation of magnetic torque.

With the above-described configuration, according to the present invention, it is possible to provide a motor, which can be started on the basis of characteristics of an induction motor, and also, can be operated on the basis of characteristics of a synchronous motor during normal operation. In other words, after being started, the rotor can be rotated at synchronous speed using the reluctance torque and the magnetic torque. Hence, according to the present invention, it is possible to eliminate complex and expensive components, such as a start inverter, etc., differently from a general synchronous motor.

Now, the principle of generating the reluctance torque and the magnetic torque in the motor according to the present invention will be described in detail with reference to FIG. 3.

First, reluctance torque will be described in detail.

As shown in FIG. 3, the flux barriers 140 are arranged along a q-axis. Here, the flux barriers 140 are formed by removing partial regions of a rotor core 123 that is made of a magnetic substance. Specifically, air layers can be created via the flux barriers 140, and non-magnetic substances, for example, resin substances can be filled in the flux barriers 140.

When a current is applied to the coils to form a magnetic pole, a magnetic flux is generated in the rotor. However, due to the flux barriers 140, extremely high reluctance is generated in the q-axis, along which the flux barriers 140 are arranged. Conversely, extremely low reluctance is generated in a d-axis, along which no flux barrier is provided.

Accordingly, the rotor will rotate in a direction to minimize reluctance difference between directions of the q-axis and d-axis. Force causing such a rotation of the rotor is called reluctance torque. The greater the reluctance difference, the greater the magnitude of reluctance torque.

Meanwhile, as shown in FIG. 3, the motor according to the present invention includes the magnets 130. If a current is applied to the coils to form a north magnetic pole, the magnets 130 can be magnetized to became a south pole. Specifically, in an arrangement of the rotor as shown in FIG. 3, a magnetic flux due to the stator and a magnetic flux due to the magnets 130 offset each other, resulting in greater reluctance of the q-axis direction. Accordingly, as compared to the absence of the magnets, greater reluctance difference between the q-axis and d-axis directions can be accomplished. Consequently, using the magnets can increase reluctance torque.

The magnets can generate magnetic torque by interaction with the stator. Specifically, if a current is applied to the coils to form a magnetic pole, the magnetic pole of the stator and the magnetic pole of the magnet interact with each other according to a relative position between the rotor and the magnet, resulting in generation of magnetic torque.

As described above, after being started, the motor according to the present invention carries out a synchronous rotation using reluctance torque and magnetic torque, thereby achieving extremely high efficiency during normal operation. This means that, assuming identical motor size and identical current strength, the motor according to the present invention can achieve extremely high efficiency as compared to a general induction motor.

Hereinafter, configuration of the rotor included in the motor according to the present invention will be described in detail with reference to FIGS. 3 to 5.

The rotor 120 includes the rotor core 123 as a basic body, and the flux barriers 140 formed in the rotor 120, more particularly, formed in the rotor core 123.

The q-axis extends radially from the center of the rotor through the flux barriers 140, along which the flow of a magnetic flux is interrupted. Also, the d-axis extends radially from the center of the rotor, along which no interruption in the flow of a magnetic flux occurs.

Here, the flux barriers can be arranged to form at least two even numbers of poles along a circumferential direction of the rotor. This arrangement is shown in FIG. 3. Specifically, when the flux barriers are arranged to form two poles, as shown in FIG. 3, the q-axis and the d-axis are spatially orthogonal to each other. Also, when the flux barriers are arranged to form four poles, although not shown, the q-axis and the d-axis have a spatial interval of 45 degrees.

Preferably, as shown in FIG. 3, each flux barrier 140 is symmetrical about the q-axis. This configuration permits reluctance torque to be symmetrical about the q-axis, thereby preventing noise or vibration due to deviation of the reluctance torque.

And, preferably, the flux barriers 140 are arranged in at least two or more layers. More specifically, it is preferable that at least two or more layers of flux barriers be arranged at each of an upper half plane and a lower half plane of the rotor shown in FIG. 3. This increases an occupation rate of the flux barriers 140 in the q-axis direction of the rotor core 123, thereby further increasing reluctance in the q-axis direction.

For the same reason, preferably, each flux barrier 140 is tilted, about the center of the rotor 120, from the center to both ends thereof such that both the ends of the flux barrier 140 are far away from or closer to an axis orthogonal to the q-axis. More specifically, as shown in FIG. 3, it is preferable that the flux barrier 140 be bulge upward or downward on the basis of the d-axis, rather than being parallel to the d-axis. The flux barrier may have an angled shape or arched shape.

Of the flux barriers 140, as shown in FIG. 3, the flux barriers 140 nearer to the center of the rotor, namely, nearer to the inside preferably have a longer length. This increases reluctance in the q-axis direction, and consequently, can maximize reluctance difference between the q-axis and d-axis directions.

Preferably, a radial width of the conductive bars 122, which are arranged within an angle $\alpha$ defined between the center of the rotor and both ends of an outermost flux barrier 140, is smaller than that of other conductive bars 122.

When the conductive bars 122 within the angle $\alpha$ have a large radial width as shown in FIG. 3, a distance between these conductive bars 122 and the adjacent flux barrier 140 becomes extremely narrow. This disadvantageously increases a possibility of leakage of a magnetic flux due to magnetic flux saturation in the d-axis direction. Therefore, to assure a sufficient distance between the conductive bars 122 and the flux barrier 140, it is preferable to reduce the radial width of the conductive bars 122 arranged within the angle α.

Meanwhile, as shown in FIGS. 4 and 5, it is preferable that both ends of the respective flux barriers 140 be positioned closely opposite the adjacent slots 121. Specifically, it is preferable to minimize a distance between both ends of the respective flux barriers 140 and the adjacent slots 121. This is to prevent a magnetic flux generated along the d-axis from leaking through gaps between the flux barriers 140 and the slots 121. When leakage of a magnetic flux through the gaps occurs, this correspondingly reduces a reluctance difference between the q-axis and d-axis directions.

However, there is a limit to reduction in the gaps between both the ends of the flux barriers 140 and the slots 121, namely, gaps between both the ends of the flux barriers 140 and the conductive bars 122 embedded in the slots 121. This is because, when the conductive bars 122 are formed in the slots 121 via, for example, aluminum die casting, too narrow gaps have a risk of bursting under a pressure, causing molten aluminum to be introduced into the flux barriers 140.

Accordingly, in order to achieve a further reduced gap with less risk of bursting, it is preferable that both the ends of each flux barrier 140 have a smaller width than that of the remaining portion of the flux barrier 140. Different embodiments related to the end shape of the flux barrier 140 are illustrated in FIGS. 5 to 7.

As will be understood from these embodiments, it is possible to minimize a length of the flux barrier 140 facing the adjacent slot 121. This has the effect of reducing an area that may burst upon receiving a pressure, and consequently, reducing the gap between the flux barrier 140 and the slot 121.

Meanwhile, the motor according to the present invention includes the magnets 130 arranged in the rotor core 123, to generate a magnetic flux for generation of magnetic torque.

The magnets 130, as shown in FIGS. 3 and 4, may be inserted into a partial region of the respective flux barriers 140. Of course, the magnets 130 may be inserted into all layers of the flux barriers 140, or may be not inserted into a specific layer of the flux barrier 140.

Meanwhile, preferably, each flux barrier 140 is continuous in a longitudinal direction thereof, and at least two or more magnets 130 are preferably arranged in the longitudinal direction of the continuous flux barrier 140. This is because it is very difficult to make a single magnet corresponding to the shape of the flux barrier. Furthermore, using a plurality of magnets is more efficient to minimize leakage of a magnetic flux generated from the magnets.

For the same reason, preferably, at least two or more magnets are arranged in a longitudinal direction of the rotor 120, namely, in a height direction of the rotor 120.

On the basis of the above-described characteristics, the magnets 130 can be composed of an identical shape of unit magnets, for example, bar-shaped unit magnets. This is advantageous to reduce manufacturing costs of the magnets, and to facilitate easy manufacture of the motor with a minimal variety of parts.

In addition, to determine insertion positions of the magnets 130 with respect to each flux barrier 140, the flux barrier 140 is preferably formed with a predetermined seating portion. Specifically, the flux barrier 140, as shown in FIGS. 9 and 11, is formed with a stepped portion 141, to determine insertion positions of the magnets 130. The seating portion also serves to prevent unwanted movement of the inserted magnets 130.

Meanwhile, preferably, an imaginary line, which connects corresponding tip ends of the magnets inserted in the respective layers of flux barriers, is parallel to the q-axis. With this arrangement of the tip ends of the magnets, the greatest magnetic flux can be generated on the basis of the q-axis. In addition, the total magnetic flux, generated by all the magnets, can take the form of a square wave rather than a sine wave.

The arrangement of the magnets enables generation of a greater magnetic torque on the basis of the q-axis and, as will be described hereinafter, permits an increase in a radial width of end-rings. The increased radial width of the end-rings has the effect of reducing loss due to the presence of the end-rings.

Hereinafter, a motor manufacturing method, in particular, a rotor manufacturing method according to the present invention will be described in detail with reference to FIGS. 8 to 14.

Referring to FIG. 8 illustrating configuration of a motor according to the present invention, the rotor core 123 may include three different shapes of unit rotor cores 124, 125, and 126. The orientation of the motor shown in FIG. 8 is suited to an upright drive motor.

Specifically, the rotor core 123 is a stack of unit rotor cores formed by stamping. The unit rotor cores may consist of the following three shapes of unit cores.

First, the unit cores 125, which constitute an intermediate portion of the rotor core 123, can include all the above-described components, namely, the slots 121 for insertion of the conductive bars 122, a shaft hole 128 for coupling of a rotating shaft (not shown), and the flux barriers 140.

Next, as shown in FIGS. 8 and 9, the unit core 126, which constitutes a lowermost portion of the rotor core 123, can include only the shaft hole 128 and the slots 121. That is, the unit core 126 has no flux barrier. Accordingly, when magnets are inserted into a partial region of the respective flux barriers 140 of the unit cores 124 and 125, the unit core 126 can prevent separation of the magnets.

Also, as shown in FIGS. 8 and 9, the unit core 124, which constitutes an uppermost portion of the rotor core 123, is formed with the shaft hole 128, slots 121, and flux barriers 140. In this case, preferably, there is provided a minimum of the flux barriers 140 required for insertion of the magnets, in consideration of the relationship with end-rings that will be described hereinafter.

Accordingly, after stacking the unit cores to obtain the rotor core shown in FIG. 8, and then, forming end-rings via aluminum die casting, magnets can be inserted into the flux barriers. In addition, with the orientation of the motor as shown in FIG. 8, it is possible to prevent scattering of magnets, via interaction between the interior of the rotor core and the magnets, without a separate anti-scattering structure.

FIGS. 11 and 12 are a top plan view and a bottom plan view of the rotor core having the above-described configuration. Specifically, according to the above-described rotor core, a general annular end-ring 151 as shown in FIG. 14 can be formed at the bottom of the rotor core.

Namely, the above-described rotor can be summarized as a rotor in which magnets are inserted after forming end-rings.

The general annular end-ring can be configured to cover the entire top surface or bottom surface of the rotor core 123 except for the shaft hole 128. Note that the greater the height and radial width of the end-rings, the smaller loss due to the end-ring. That is, similar to loss due to the conductive bar, the loss due to the end-ring can be reduced to the maximum extent.

However, increasing the height of the end-ring increases the size of the motor, and thus is limited. Accordingly, it is more preferable to increase the radial width of the end-ring, in order to reduce loss due to the end-ring.

Meanwhile, the uppermost unit core 124 shown in FIG. 8 can be replaced by the lowermost unit core 126 shown in FIG.

10. Specifically, the uppermost and lowermost unit cores can be replaced by the unit core 126 shown in FIG. 10. The resulting configuration is an alternative configuration of the motor according to the present invention.

In the alternative configuration, after stacking the intermediate unit core 125 on the lowermost unit core 126, magnets are inserted into the flux barriers. Then, the uppermost unit core (in this case, identical to the lowermost unit core) is stacked thereon, and conductive bars and end-rings are formed via aluminum die casting.

The above-described rotor core is shown in plan view of FIG. 12. The rotor core shown in FIG. 12 can use the general annular end-rings 151 as shown in FIGS. 12 and 14, which are provided at the top and bottom thereof.

More specifically, the above-described rotor can be summarized as a rotor in which end-rings are formed after inserting magnets. Accordingly, the motor including the above-described rotor can prevent scattering of magnets by the uppermost and lowermost unit cores, even if it is not utilized in an upright drive manner.

Meanwhile, in the above-described configuration, the motor according to the present invention always includes the end-rings, which do not interfere with the magnets, but are connected with the plurality of conductive bars 122. Of course, the end-rings do not interfere with the flux barriers 140.

More specifically, in an alternative configuration of the above-described motor, the uppermost and lowermost unit cores of the rotor core are not formed with the flux barriers 140, and thus, there is no interference between the end-rings and the flux barriers 140. Hence, the shape of the end-rings can be freely selected from all general end-ring shapes, and this has the effect of minimizing loss due to the end-rings.

However, in the above-described configuration of the motor, the end-ring 150 must be formed after completing the rotor core and prior to inserting the magnets into the flux barriers. In this case, it is important to eliminate any interference between the magnets and the end-ring 150. Namely, the end-ring 150 must be configured to have a space for insertion of the magnets.

Here, to minimize loss due to the end-rings 150 as described above, it is preferable to increase the radial width of the end-rings 150. Therefore, preferably, the uppermost unit core 124 has a minimum of the flux barriers 140 required for insertion of the magnets.

In this case, the end-ring 150 can be configured to have a shape as shown in FIGS. 11 and 13. Specifically, the end-ring 150 can be divided into a q-axis direction portion and a d-axis direction portion, and a width of the d-axis direction is larger than a width of the q-axis direction. This is efficient to minimize loss due to the end-ring 150. In addition, since it is preferable to increase the width of the q-axis direction portion of the end-ring 150, the flux barriers 140 are more preferably configured to be converged toward the center of the rotor as shown in FIG. 11. Also, an inner circumference of the d-axis direction portion of the end-ring preferably extends in parallel to the q-axis.

Also, preferably, an inner circumference of the q-axis direction portion of the end-ring extends in parallel to the adjacent flux barrier.

Accordingly, in the above-described configuration, the end-ring 150 is an annular end-ring in which a radial width thereof varies along a circumferential direction of the rotor core 123. Moreover, the width of the q-axis direction of the end-ring is larger than that of the d-axis direction portion.

Hereinafter, operation of the motor according to the present invention will be described in detail with reference to FIGS. 15 to 17.

The motor according to the present invention is basically applicable to variable-load fan motors, compressors, home electronics, etc. Hereinafter, for the convenience of description, a motor for use in a rotary compressor will be described.

Generally, a rotary compressor mainly uses a single-phase induction motor, and thus, has a problem of low efficiency due to the above-described characteristics of the single-phase induction motor. Hence, it will be appreciated that the motor according to the present invention is advantageously applicable to the rotary compressor, etc., to improve the efficiency of the compressor.

Recently, a variable capacity compressor, in which a single rotary compressor can carry out variable capacity operation, has been mainly used.

As one example, there is a compressor capable of varying a capacity by changing the quantity of a refrigerant to be compressed in a single cylinder. This kind of compressor is disclosed in Korean Patent Laid-Open Publication No. 10-2006-0120387, wherein a refrigerant is selectively compressed in a plurality of cylinders to vary a capacity of the compressor.

Here, a capacity variation of the compressor means a variation of motor load for compression of a refrigerant. Accordingly, to achieve an outstanding high efficiency of the variable capacity compressor, it is advantageous to use the motor according to the present invention rather than a general induction motor.

This is because the motor according to the present invention is always operated at synchronous speed not only during normal operation, but also even if motor load varies. In addition, since the motor is operated using reluctance torque and magnetic torque even if a temperature thereof rises, it is possible to minimize loss due to temperature increase. It can be said that the above described effects are very outstanding effects in consideration of the facts that a general single-phase induction motor suffers from serious loss due to temperature increase, and that the internal temperature of the compressor significantly rises during operation of the compressor.

FIG. 15 illustrates the relationship between starting torque and capacitor value.

As shown, the greater the capacitor value, the greater the starting torque. Meanwhile, to initiate the starting of the motor, the starting torque must be greater than a predetermined value. Namely, the starting torque must have a value sufficient to overcame an initial motor load. Accordingly, if the initial motor load increases, the magnitude of the starting torque required to overcome the motor load for the starting of the motor must be further increased.

Meanwhile, FIG. 3 illustrates a coil circuit having only a single capacitor. In this case, if motor load varies, the capacitor value must be increased to sufficiently overcome the motor load so as to start the motor. However, since using a high capacitor value under low motor load condition incurs loss, it is preferable that the capacitor value be varied according to variation in motor load.

For this, the motor according to the present invention, as shown in FIGS. 16 and 17, may include capacitors connected in parallel.

Specifically, the coils include a main winding connected with a single-phase power source, and an auxiliary winding connected parallel to the main winding while being connected to the single-phase power source. Also, the capacitors, connected in parallel to each other, are connected to the auxiliary winding in series. More specifically, the circuit shown in FIGS. 16 and 17 can substitute for the capacitor shown in FIG. 3.

A value of the two capacitors, connected in parallel to each other, is equal to the total of the capacitor values when a switch S is kept on. Accordingly, when the switch S is turned on, a great capacitor value is obtained, resulting in a greater starting torque. Conversely, when the switch is turned off, a value of only one capacitor is obtained, resulting in relatively small starting torque.

Accordingly, it is preferable that the switch be selectively turned on or off according to variation of the motor load, and mare particularly, be turned on under high motor load and be turned off under low motor load.

For example, assuming that the compressor's capacity is divided into a large capacity and a small capacity, FIG. 16 illustrates operation of a large-capacity compressor, and FIG. 17 illustrates operation of a small-capacity compressor. As can be seen from the drawings, it is advantageous, in view of efficiency improvement, to not use a large capacitor when the compressor has a low operation capacity.

Meanwhile, upon initial starting of the motor, namely, upon initial starting of the compressor, the capacity of the compressor can be preset. For example, the compressor can be preset to operate with a large capacity or a small capacity.

Preferably, the motor is rapidly started to implement normal operation. To enable the rapid initial starting and at the same time, to achieve better starting characteristics, it is preferable that the switch be kept on during initial starting of the motor. Namely, preferably, the switch is always kept on regardless of the preset capacity.

More specifically, despite that the compressor is initially set to operate with a small capacity, if the compressor begins to operate while keeping the switch on and a desired time passes or a desired condition is satisfied, it is preferable to turn off the switch. Conversely, despite that the compressor is initially set to operate with a large capacity, if the compressor begins to operate while keeping the switch on and no operating condition is changed, it is preferable to keep the switch on.

Note that the switch can be selectively turned on or off according to capacity variation during normal operation.

Accordingly, the switch S can be selectively turned on or off on the basis of whether or not the motor is started initially and whether or not capacity varies during operation. This assures stable starting of the motor. In addition, a reduced initial starting time permits the compressor to rapidly reach normal operation, resulting in improved compressor efficiency. This is because, as described above, the motor according to the present invention can rotate at synchronous speed using reluctance torque and magnetic torque during normal operation, and can achieve extremely high normal operation efficiency.

It will be apparent to those skilled in the art that various modifications and variations can be made in the present invention without departing from the spirit or scope of the invention. Thus, it is intended that the present invention cover the modifications and variations of this invention provided they came within the scope of the appended claims and their equivalents.

INDUSTRIAL APPLICABILITY

The present invention can provide a motor having improved efficiency and a variable capacity compressor including the motor.

The invention claimed is:

1. A motor, in which a rotor is started using induction torque generated as power is supplied to a coil of a stator, wherein the rotor comprises:
    a rotor core;
    conductive bars arranged, along a circumferential direction, in an outer rim region of the rotor core, to generate an induction current;
    flux barriers formed in the rotor core, to interrupt flow of a magnetic flux, for generation of reluctance torque, wherein the flux barriers are arranged to provide the rotor with poles, and wherein the flux barriers that constitute each pole are arranged in two or more layers; and
    magnets provided in the rotor core, to generate a magnetic flux, for generation of magnetic torque,
    wherein a radial width of the conductive bars that are arranged within an angle defined between the center of the rotor and both ends of an outermost flux barrier is smaller than a radial width of other conductive bars.

2. The motor according to claim 1, wherein the rotor is started using induction torque generated by the conductive bars, and, once started, is rotated using the reluctance torque generated by the flux barriers and the magnetic torque generated by the magnets.

3. The motor according to claim 2, wherein the rotor, once started, is rotated at synchronous speed using the reluctance torque and the magnetic torque.

4. The motor according to claim 1, wherein the power supplied to the coil is single-phase power.

5. The motor according to claim 4, wherein induction torque is generated by a rotating magnetic field generated in the stator and the induction current generated in the rotor.

6. The motor according to claim 5, wherein the coil includes a main winding and an auxiliary winding, which are connected with a single-phase power source for supply of the single-phase power and also, are connected in parallel to each other, and the auxiliary winding is connected to a capacitor in series.

7. The motor according to claim 1, wherein the rotor is rotatably provided inside the stator.

8. The motor according to claim 7, wherein the flux barriers are arranged to provide the rotor with two or more pairs of poles.

9. The motor according to claim 8, wherein the rotor includes:
    a q-axis extending radially from a center of the rotor, along which the flow of a magnetic flux is interrupted by the flux barriers; and
    a d-axis extending radially from the center of the rotor, along which the flow of a magnetic flux is not interrupted.

10. The motor according to claim 9, wherein the rotor includes two pairs of poles, and the q-axis and the d-axis are spatially orthogonal to each other.

11. The motor according to claim 9, wherein each flux barrier is symmetrical about the q-axis.

12. The motor according to claim 11, wherein the flux barrier is tilted, about the center of the rotor, from the center to both ends thereof such that both the ends of the flux barrier are far away from or closer to an axis orthogonal to the q-axis.

13. The motor according to claim 1, wherein the flux barrier of each layer is continuously formed.

14. The motor according to claim 13, wherein the flux barriers, from the outside nearer to the inside of the rotor, have a longer length.

15. The motor according to claim 14, wherein the magnets are inserted into a partial region of the respective flux barriers.

16. The motor according to claim 15, wherein the magnets include two or more magnets arranged in a longitudinal direction of the respective flux barriers.

17. The motor according to claim 15, wherein the magnets include two or more magnets arranged in a longitudinal direction of the rotor.

18. The motor according to claim 15, wherein the magnets include unit magnets having the same shape as one another.

19. The motor according to claim 15, wherein each flux barrier is formed with a stepped portion to determine insertion positions of the associated magnets.

20. The motor according to claim 14, wherein an imaginary line, which connects corresponding tip ends of the magnets inserted in the respective layers of flux barriers, is parallel to the q-axis.

21. The motor according to claim 14, wherein both ends of the respective flux barriers are arranged closely opposite the adjacent conductive bars, to minimize leakage of the magnetic flux through gaps between the flux barriers and the conductive bars.

22. The motor according to claim 21, wherein the ends of each flux barrier have a smaller width than that of the remaining portion of the flux barrier.

23. The motor according to claim 1, wherein the magnets are inserted into a partial region of the respective flux barriers.

* * * * *